July 11, 1933.  G. W. CRABTREE  1,917,753
COVER FOR LEAF SPRINGS
Filed Jan. 27, 1930  4 Sheets-Sheet 3
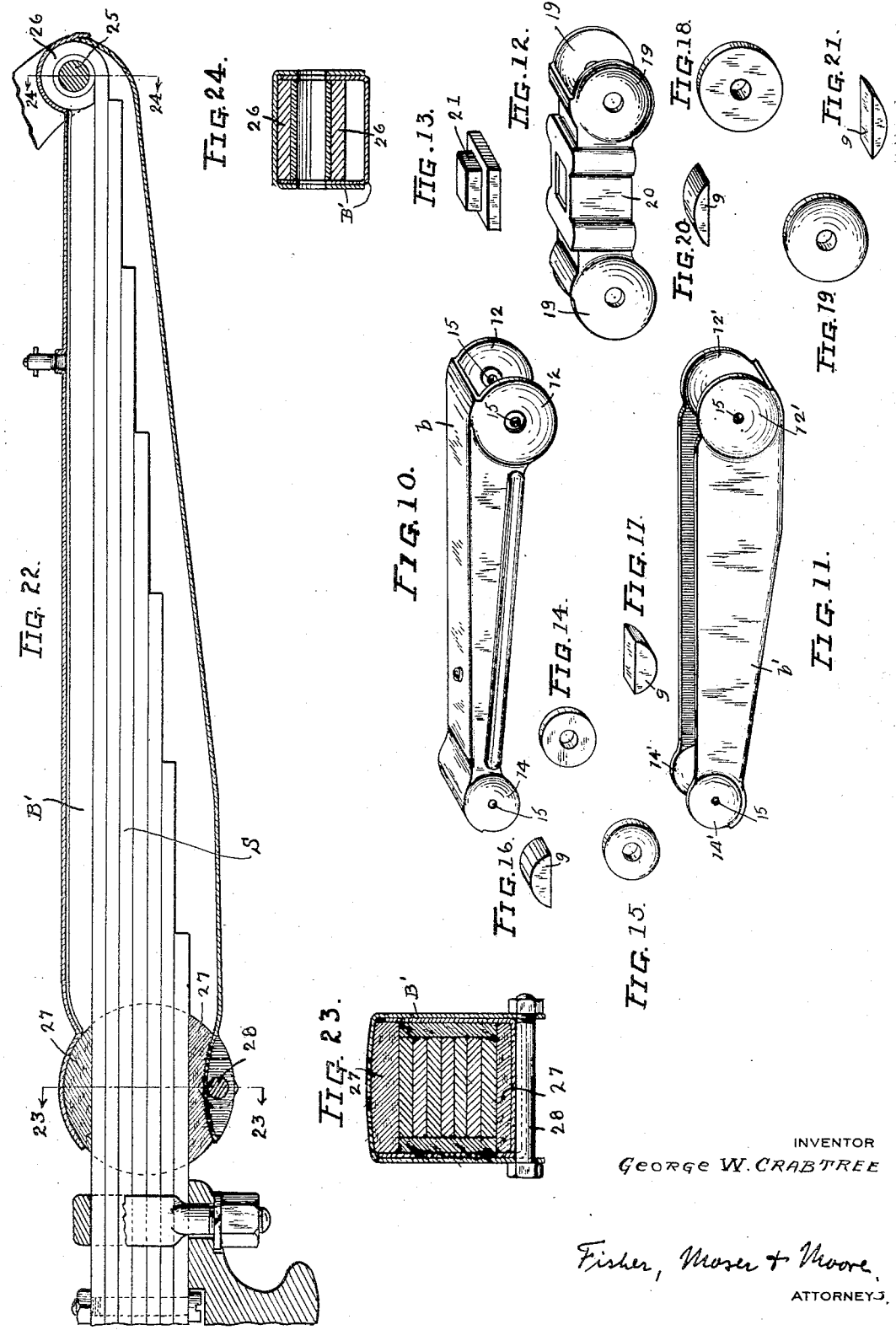
INVENTOR
GEORGE W. CRABTREE
Fisher, Moser + Moore
ATTORNEYS

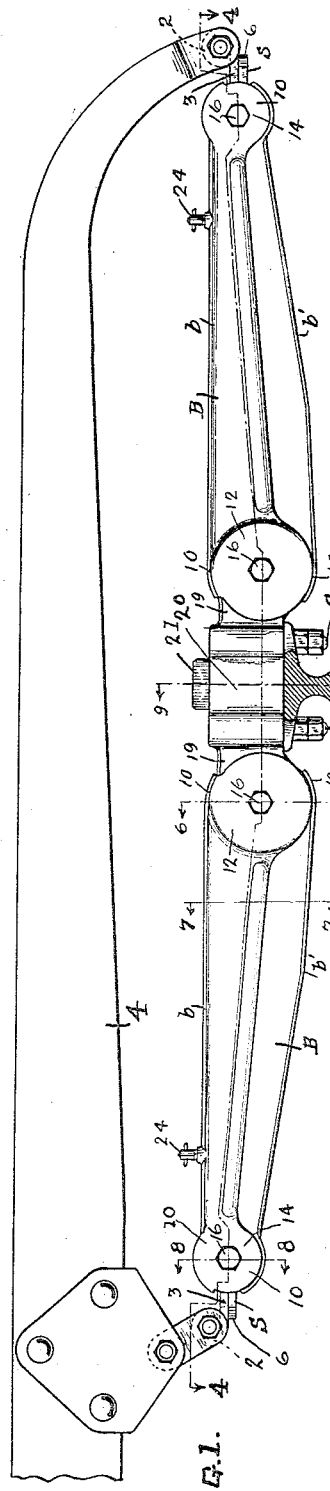

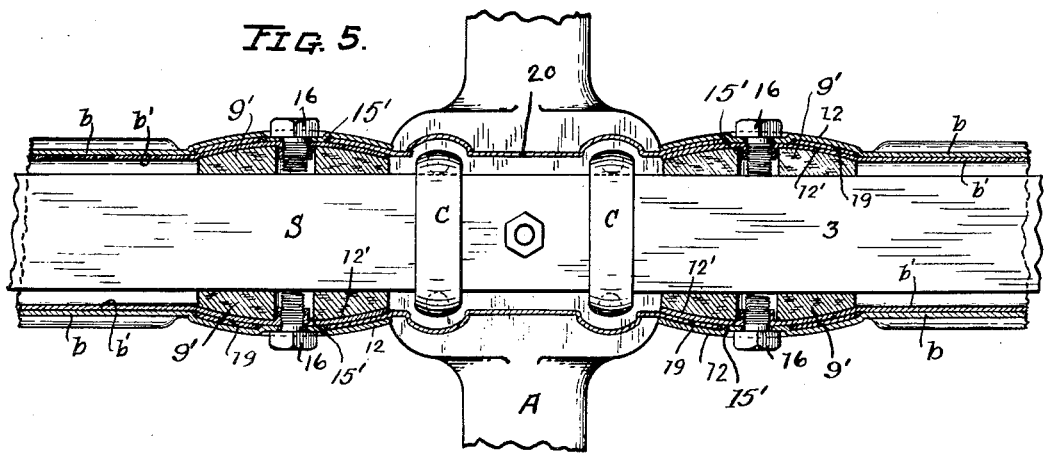
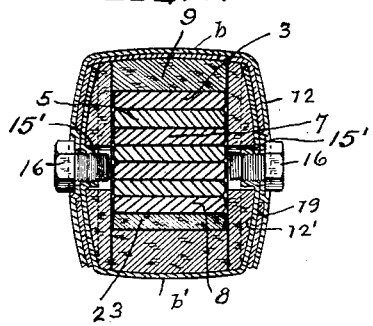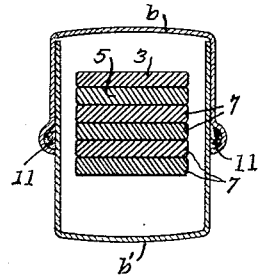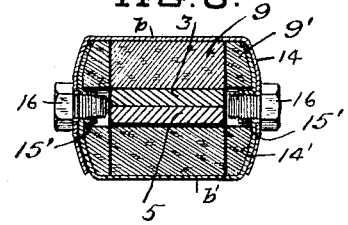
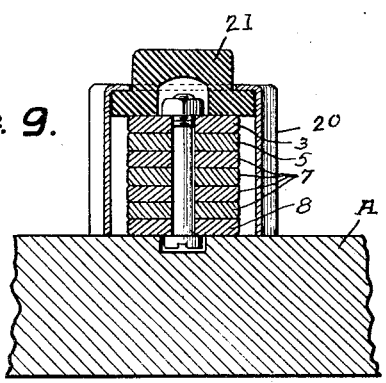

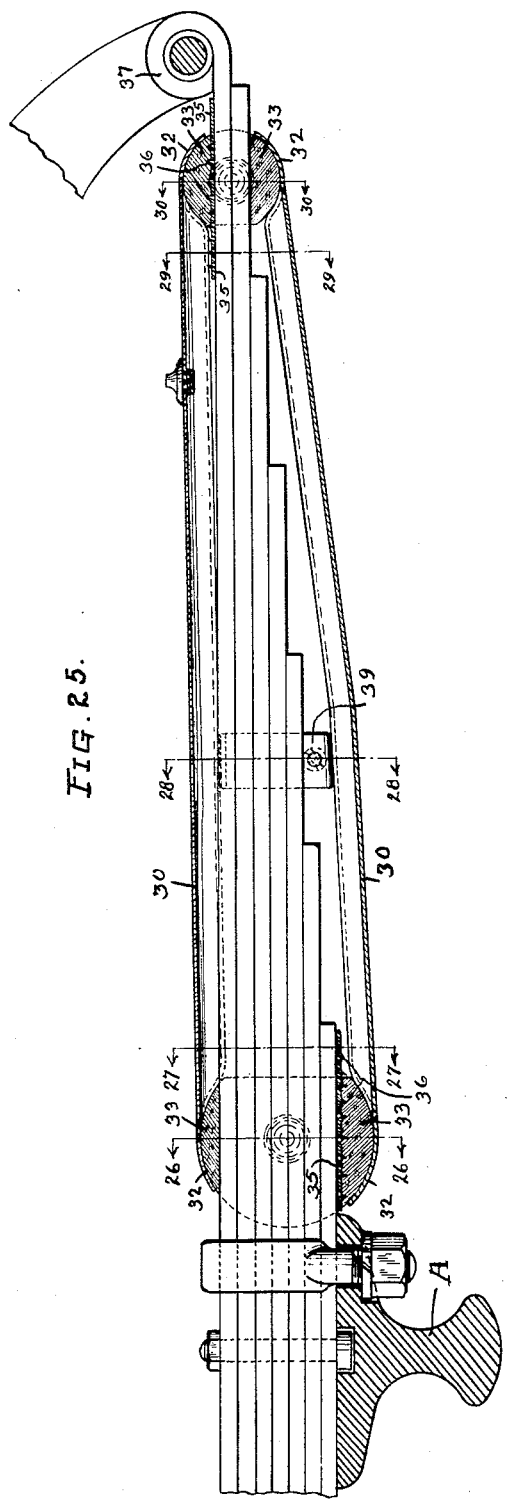
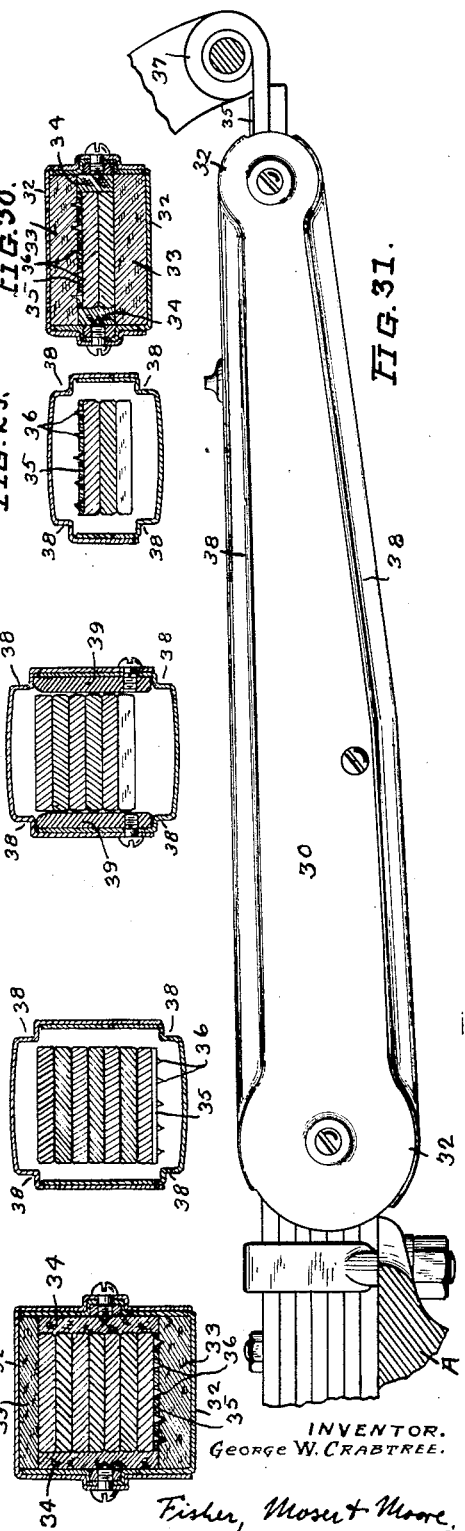

Patented July 11, 1933

1,917,753

UNITED STATES PATENT OFFICE

GEORGE W. CRABTREE, OF CLEVELAND HEIGHTS, OHIO

COVER FOR LEAF SPRINGS

Application filed January 27, 1930. Serial No. 423,614.

My invention relates to an improvement in protective covers or casings for laminated vehicle springs, and the object of the invention in general is to provide a cover or casing made of pressed sheet metal, the structure itself being rigid and unyielding but particularly constructed to permit the spring to flex within limits therein and to maintain a tight and noiseless joint or union wherever the cover is connected with the spring and relative movement occurs between the parts. The cover is also constructed in a particular way to permit the parts thereof to be readily attached to a vehicle spring, and to be separated and bodily removed therefrom for inspection of the spring, repairs or replacements of parts. The present cover is also designed to receive and hold grease or any other suitable lubricant, the joints between the parts being made substantially fluid-tight, and the number of joints being reduced to a minimum to prevent leakage. The formation of the joints also permits this type of cover to be readily affixed in tight noiseless connection with vehicle springs embodying a greater or lesser number of spring leaves.

These and other objects and advantages of the device will be made more manifest and clear upon referring to the following detailed description of the invention and to the accompanying drawings, in which Fig. 1 is a side view of a portion of a vehicle frame and a spring, including a cover for the spring constructed according to my invention. Fig. 2 is a plan view of the cover and spring showing a portion of the vehicle axle and with the shackle links at the ends of the spring omitted. Fig. 3 is a side elevation of the spring and a sectional view of the axle and cover on longitudinal line 3—3 of Fig. 2. Fig. 4 is a plan view of the spring and a horizontal section of the cover on line 4—4 of Fig. 1.

Fig. 5, sheet 2, is an enlarged view corresponding to Fig. 4, but only showing the middle portion of the spring and the connecting portions of the cover in that region. Fig. 6 is a cross section of the spring and cover at one hinged joint, this view being taken on line 6—6 of Fig. 1. Fig. 7 is a cross section on line 7—7 of Fig. 1; Fig. 8 is a cross section on line 8—8 of Fig. 1, and Fig. 9 a sectional view on line 9—9 of Fig. 1.

Figs. 10 to 21, inclusive sheet 3, are perspective views, Fig. 10 showing the upper channel section of one cover; Fig. 11 the bottom channel section; Fig. 12 the cap or connecting member; Fig. 13 the rubber buffer; Figs. 14, 15, 16 and 17 the separate pieces of cork employed at one end of the cover to produce a tight noiseless slidable joint; and Figs. 18, 19, 20, and 21, the separate pieces of cork used at the opposite end of the cover to produce a tight hinged joint. Fig. 22 is a side view of a laminated vehicle spring and a sectional view of a modified form of cover embodying the invention, and Figs. 23 and 24 are cross sections thereof on lines 23—23 and 24—24 respectively, of Fig. 22.

Fig. 25, sheet 4, is a side and sectional view of a further modification of the invention, and Figs. 26 to 30, inclusive, are cross sectional views thereof on lines 26—26, 27—27, 28—28, 29—29, and 30—30, respectively, of Fig. 25. Fig. 31 is a side view of the parts shown in Fig. 25.

Now referring to sheet 1 of the drawings, the laminated leaf spring S shown therein exemplifies one type of spring in common use affixed at or about its middle to an axle A by clips C as customarily. The outer eye ends 2 of the longer leaf 3 of the spring are also shackled to a vehicle frame 4 in the customary manner or in any acceptable way to permit the spring to flex under load. Usually the normal load flattens out the spring substantially as shown in the drawings, but the present invention is not limited in its application and use to a flat spring alone or to the exact kind and type of spring delineated. Thus, it may be attached to and used with curved springs, semi-elliptic or quarter elliptic, etc.

Usually the uppermost and longest leaf 3 of the spring is supplemented or backed up by a second leaf 5 of substantially the same length, the end or opposite ends 6 thereof terminating relatively near the end loops or eyes 2 of the main leaf 3. The remaining laminations or leaves 7 vary in number according to the work or load to be carried, and each succeeding leaf is of shorter length than the preceding one. Regardless of the number of leaves in the spring the shortest leaf 8 affixed to the spring seat or axle A extends beyond the same a substantial distance or is exposed sufficiently to provide a flat area corresponding in length to the exposed outer end of the second leaf 5. In the present instance and referring only to one-half of the spring, the exposed ends of leaves 5 and 8, respectively, and parts of the top leaf 3, are utilized as seating surfaces for separate pieces 9 of cork or equivalent material, which pieces form sealing elements and parts of a joint and coupling connection between the opposite ends of a sheet metal cover B and the spring. Preferably, the cork pieces 9 are cylindrical segments as long or substantially as long as the width of the spring leaves, and their flat sides are seated upon the spring leaves and nested within correspondingly curved seats or shallow cavities 10 formed at the opposite ends of cover B. In a spring of the type shown in Fig. 3, the covers B are in duplicate, as will be explained hereinafter, and each cover is composed of two separable sections b—b' pressed into channel form from sheet metal so that they may encase the spring when their side walls are placed in overlapping relation as shown in Fig. 7. Preferably, the bottom sections b' is nested within the upper section b to shed water, although the inherent spring in the metal maintains a snug fit between the overlapping side walls whereby water and dirt will be excluded in any event. The longitudinal border edge of each side wall in upper section b is beaded or channeled to strengthen the same and to permit a strip 11 of packing material to be confined therein if further sealing protection is desired at this point. The upper channel member or section b is of tapering shape and the side walls thereof are formed at their opposite ends with circular outwardly-swelling bosses or dished enlargements 12 and 14, respectively, and the bottom section b' is likewise provided with complementary circular bosses or dished enlargements 12'—14', whereby spring interlocking of the two sections may be effected when the two sections are assembled. In addition the two sections are screwed or bolted together, the circular dished portions on each channel member having registering openings 15 centrally within said member for screws or bolts 16. Preferably the stock around the openings 15 in bottom member b' is turned inwardly or flanged to permit screw-threading thereof, and to form inwardly extending bosses 15' for seating cork disks 9' as will hereinafter be described, and the swelling bosses 12 in the upper member b are slightly countersunk, although not necessarily.

The channeled members b and b' are wider than the spring leaves, and therefore cork disks 9' also bear against and conform circularly to the cork segments 9 seated upon the top and bottom faces of the spring leaves, and when four pieces of cork of that form and shape are assembled at each end of the cover, they close and seal the joints thereat most effectually, while permitting free movement and relative shift to occur between the spring and cover. The segmental pieces of cork also space the respective channels members of the cover substantial distances apart from the top and bottom faces of the spring so that the spring may flex freely within limits within the cover without striking the top or bottom walls thereof. To foster that purpose still further the cover sections or members are tapered to conform to the stepped or tapered formation of the spring, and the dished bosses 12 and cork elements 9' at the opposite ends of the cover members are of different diameters. However, the dimensions, shape and rigid construction of the cover may be such that the spring may be permitted to flex only within predetermined limits, say within reasonably safe elastic limits of tension of the spring, and then be caused to engage the cover between its ends to re-enforce the spring and prevent further flexing thereof. In that connection it should be noted that the cover is a rigid tubular body housing the spring and that this body is coupled at one end to the thick unyielding part of the spring and at its opposite end to the flexible end of the spring. Flexing of the spring into an arcuate shape, or from an arcuate shape to a straight form, produces relative longitudinal movement between the cover and the spring, regardless of whether the cover is free to shift at both ends relatively to the spring, or only one end of the cover is free to shift and the other end is anchored to permit the cover to pivot or swing. But in either case when the spring is flexed a change in angularity between the cover and spring takes place which produces relative turning or rotatable movement between the cylindrical and circular cork pieces 9, 9' respectively and the end sockets in the cover. In effect, the rounded faces of the cork pieces 9 and 9' function as rotatable bearings, and these parts also permit a longitudinal sliding movement to take place, especially at the outer end of the cover where the first and second leaves of the spring are embraced by the cork pieces. To promote the turning movement at this point, the common axis of the cylindrical cork segments 9 and the plano-concavo disks 9', is located in the plane between the first and second leaf, thus locating this part of the spring centrally within this rotatable and slidable joint for the cover.

In the structure shown in Figs. 1 to 4, the inner end of the metal cover is pivotally connected to embossed extensions 19—19 forming part of the side walls of a yoke member or cap 20 which is seated on the axle or spring seat to cover the spring where it is clipped to the axle or spring seat, and the top of cap 20 is provided with an opening through which a rubber buffer 21 projects, the buffer being flanged to permit the cap to compress and hold it seated on the top of the spring.

In a spring of the semi-elliptic type two covers would be used, and cap 20 would be constructed to cover the entire middle part of the spring and have embossed extensions 19 on opposite sides of the axle to permit the two covers to be pivotally affixed thereto, say substantially as indicated in Fig. 5, wherein the extensions 19 are interposed between the embossed or cupped ends 12—12' of the two channeled members or sections b—b', respectively, composing each cover for the spring. Accordingly, in this form of the invention the spring is encased within a fixed central cap or cover, and a pair of tubular covers rigid throughout their own length but hinged to the central cap or cover. Furthermore, each tubular cover is coupled at its opposite ends to the spring by a sealed joint adapted to accommodate the relative movements between the parts. Also, the segmental pieces of cork at the hinged joint for each tubular cover, may be made in sections or layers as exemplified in Fig. 3, wherein a thin section 23 of approximately the same thickness as a spring leaf is used to permit the device to be attached to either thicker or thinner springs, or springs having a greater or lesser number of spring leaves, it being understood that one or more sections 23 may be added or omitted. Each tubular cover may also be provided with lubricating openings, or with valved fittings 24 adapted to facilitate the introduction of grease or oil under pressure into the cover. Preferably, the bottom wall of the cover is inclined downwardly from the freely flexible end of the spring toward the base or thicker part of the spring to better accommodate the flexing movements of the spring and to provide a storage space for the lubricant.

Now referring to Figs. 22 to 24, inclusive, in this form of the invention the rigid tubular cover B' is also made of two channeled sections made of sheet metal and nested together around the spring S, but in lieu of coupling the cover to the axle or thicker part of the spring, I connect the outer end of the cover sections with the shackle bolt 25 or the eye 26 of the spring. The inner end of the tubular cover is free to slide longitudinally of the spring and is coupled thereto by separate pieces 27 of cork or equivalent material confined between the top and bottom walls and also the side walls of the channeled members. A single clamping bolt 28 may be used in this form of the device to secure the channeled members together upon the spring and to compress the cork pieces in tight sealing contact with the spring.

In Figs. 25 to 31, I show a further modification of the invention, comprising a rigid metal tube 30 made of two channeled members adapted to be nested around a spring and to be secured together by screws or equivalent means. This tube also includes means for coupling the opposite ends of the tube to the spring with sealing effect and so that the spring may flex and the cover shift or move longitudinally in respect to the spring. Thus, the opposite ends of the cover sections are fashioned with circular sockets 32—32 adapted to receive and hold cylindrical segments 33 of cork above and below the spring, and also cork disks 34—34 on opposite sides of the spring. Short plates 35 rest slidably against the top and bottom leaves of the springs, and are anchored to the cork segments 33 by prongs 36. The outer ends of these plates extend beyond the rounded ends of the cover where one may come into engagement with the eye 37 of the top leaf of the spring and the other may abut against the axle A, whereby the longitudinal movement of the cover may be limited relatively to the spring. However, a limited amount of play is provided to permit the cover to shift on the spring when it flexes either upwardly or downwardly in use. The longitudinal corner edges 38 of the channeled members are rabbeted or bent inwardly to strengthen the same, and metal strips 39 are secured vertically to the inner side walls of the bottom member at each side of the spring to hold the cover in parallel alignment with the spring and to prevent the leaves of the spring from fanning, that is, from spreading or moving laterally in opposite directions.

What I claim, is:

1. A vehicle spring cover, comprising a longitudinally-divided tubular body adapted to encase a laminated spring with freedom for the spring to flex therein, the opposite ends of said tubular body having rotatable sealing elements socketed therein and engaged with the spring.

2. A vehicle spring cover, comprising a rigid tubular body made of two channeled members, and rotatable means contacting with opposite sides of said spring for sealing and effecting a jointed union at the opposite ends of said body with the spring.

3. A vehicle spring cover, comprising a pair of channeled members adapted to be nested around a laminated spring and having at one end a circular seat containing rotatable sealing elements engaged with the spring.

4. A vehicle spring cover, comprising a rigid tubular casing divided longitudinally into two separable parts having complementary end seats therein, and movable segmental sealing elements confined within said seats and in longitudinally shiftable engagement with said spring.

5. A vehicle spring cover, comprising a pair of channeled members adapted to encase a laminated spring, said members having complementary seats therein at opposite ends thereof, and sectional pieces of compressible material confined within said seats and in longitudinally shiftable engagement with said spring.

6. A vehicle spring cover, comprising a pair of channeled members adapted to enclose a spring, said members having circular recesses at corresponding ends thereof, and compressible means seated within said recesses and surrounding said spring.

7. A vehicle spring cover, comprising a rigid elongated casing divided longitudinally to enclose a spring, each end of said casing having arcuate recesses therein at the top and bottom surfaces of the spring, and means confined within said recesses and at each side of the spring for sealing the ends of said casing.

8. A vehicle spring cover, comprising a tubular casing having embossed extremities, and rotatable means having sound-deadening and fluid-sealing properties embedded in said embossed extremities and in longitudinal shiftable engagement with said spring.

9. A vehicle spring cover, comprising a tubular casing made of separable parts having complementary arcuate recesses at corresponding ends thereof, circular pieces of compressible material confined within said recesses and engaging said spring, and compressible material confined between certain walls of said casing and the upper and lower faces of the spring and said circular pieces.

10. A vehicle spring cover, comprising a pair of channeled members adapted to encase a laminated spring, said members having rounded sockets at opposite ends thereof and one of said members having inwardly extending bosses at each side, in combination with sectional pieces of compressible material confined within said sockets and disks of such material upon said bosses.

11. A vehicle spring cover, comprising a pair of channeled members adapted to encase a laminated spring, one of said members having circular bosses in both sides thereof adjacent opposite ends, ring shaped sealing members sleeved over said bosses, and means positioned between and co-operating with said sealing members for effecting a jointed union of said spring with the opposite ends of said channeled members.

12. A vehicle spring cover, comprising a rigid tubular casing made of separable pieces adapted to enclose a laminated spring, one end of said casing being pivotally supported for pivotal movement with respect to said spring and sealing means embracing the spring, and the opposite end of said casing having rotatable sealing means therein embracing the spring and longitudinally movable relatively to said spring.

13. A vehicle spring cover comprising a rigid tubular casing made of separable parts adapted to enclose a spring, each end of said casing having interchangeable sectional pieces of compressible material rotatably confined therein, said sectional pieces embracing the spring and being in longitudinally shiftable contact therewith to permit shifting of said casing with respect to said spring.

14. A vehicle spring cover comprising a rigid tubular metal body adapted to encase a spring and spacing means including rotatable elements mounted within said body at opposite ends thereof, said spacing means in said body being frictionally engaged with said spring to space said spring with respect to said body and permit longitudinal movement between said spring and body during action of said spring.

15. A vehicle spring cover comprising a rigidly formed tubular body of tapering formation adapted to encase a laminated spring, and spacing means including rotatable elements within and at opposite ends of said body, said spacing means being frictionally engaged with all four sides of said spring to space said body from said spring a substantial distance for permitting free flexing of said spring in said body.

In testimony whereof I hereby affix my signature.

GEORGE W. CRABTREE.